(12) United States Patent
Gonzaga et al.

(10) Patent No.: US 9,254,722 B2
(45) Date of Patent: Feb. 9, 2016

(54) TOOL FOR SUPPORTING AND LOCKING A RIM OR TIRED WHEEL FOR MOTORCYCLES

(71) Applicant: Butler Engineering & Marketing S.p.A., Rolo (IT)

(72) Inventors: Tullio Gonzaga, Correggio (IT); Silvano Santi, Imola (IT)

(73) Assignee: BUTLER ENGINEERING AND MARKETING S.P.A., Rolo, Reggio Emilia (IT)

( * ) Notice: Subject to any disclaimer, the term of this patent is extended or adjusted under 35 U.S.C. 154(b) by 522 days.

(21) Appl. No.: 13/686,462

(22) Filed: Nov. 27, 2012

(65) Prior Publication Data

US 2013/0139974 A1 Jun. 6, 2013

(51) Int. Cl.
*B60C 25/01* (2006.01)
*B60C 25/138* (2006.01)
*B60B 30/06* (2006.01)
*B60B 30/00* (2006.01)

(52) U.S. Cl.
CPC ............... *B60C 25/01* (2013.01); *B60B 30/00* (2013.01); *B60B 30/06* (2013.01); *B60C 25/138* (2013.01); *Y10T 29/49716* (2015.01)

(58) Field of Classification Search
CPC ... B60C 25/138; B60C 25/0545; B60C 25/132; B60C 25/128; G01M 17/021; B29B 17/0404; B60B 30/00; B25B 15/00; B25B 23/142; B25B 23/1427
USPC ............................ 157/14, 16, 1.24, 1.26, 1.28
See application file for complete search history.

(56) References Cited

U.S. PATENT DOCUMENTS

| | | | | |
|---|---|---|---|---|
| 2,569,789 A * | 10/1951 | Weaver | ......... | 157/1.24 |
| 2,873,777 A * | 2/1959 | Thostenson | ......... | 157/16 |
| 3,557,861 A * | 1/1971 | Duquesne | ......... | 157/1.24 |
| 4,250,936 A | 2/1981 | du Quesne | | |
| 4,884,611 A * | 12/1989 | Schmidt | ......... | 157/1.24 |
| 5,226,465 A * | 7/1993 | Schon et al. | ......... | 157/1.28 |
| 5,719,331 A * | 2/1998 | Delmoro | ......... | 73/146 |
| 7,204,493 B1 * | 4/2007 | Gatton | ......... | 279/106 |
| 2005/0199349 A1 * | 9/2005 | Matteucci | ......... | 157/16 |
| 2011/0290428 A1 | 12/2011 | Roussel | ......... | 157/1.22 |

FOREIGN PATENT DOCUMENTS

DE 16 80 348 A1 10/1971
DE 1680348 10/1971

(Continued)

OTHER PUBLICATIONS

Search Report dated May 23, 2012 issued in corresponding Italian Patent Application No. VR2011A000214.

(Continued)

*Primary Examiner* — Robert Scruggs
(74) *Attorney, Agent, or Firm* — Tutunjian & Bitetto, P.C.

(57) ABSTRACT

The present invention disclosure relates to a tool for supporting and locking a rim or tired wheel in position on a tire mounting-demounting machine for automobile wheels equipped with support table with an axial hole or opening, the tool including grip-release device for a tired wheel (TW) or a rim (W) to be handled, and locking means for locking the grip-release device to the support table and/or for locking the rim (W) or tired wheel (TW) against components of the grip-release device.

19 Claims, 6 Drawing Sheets

(56) References Cited

FOREIGN PATENT DOCUMENTS

| EP | 0 001 855 A1 | 5/1979 |
| FR | 1 567 801 A1 | 5/1969 |
| FR | 1567801 | 5/1969 |
| WO | WO 2009/015920 A1 | 2/2009 |

OTHER PUBLICATIONS

European Search Report dated Jan. 11, 2013 issued in connection with corresponding European Patent Application No. EP 12 194 968.9. Total 5 pages.

* cited by examiner

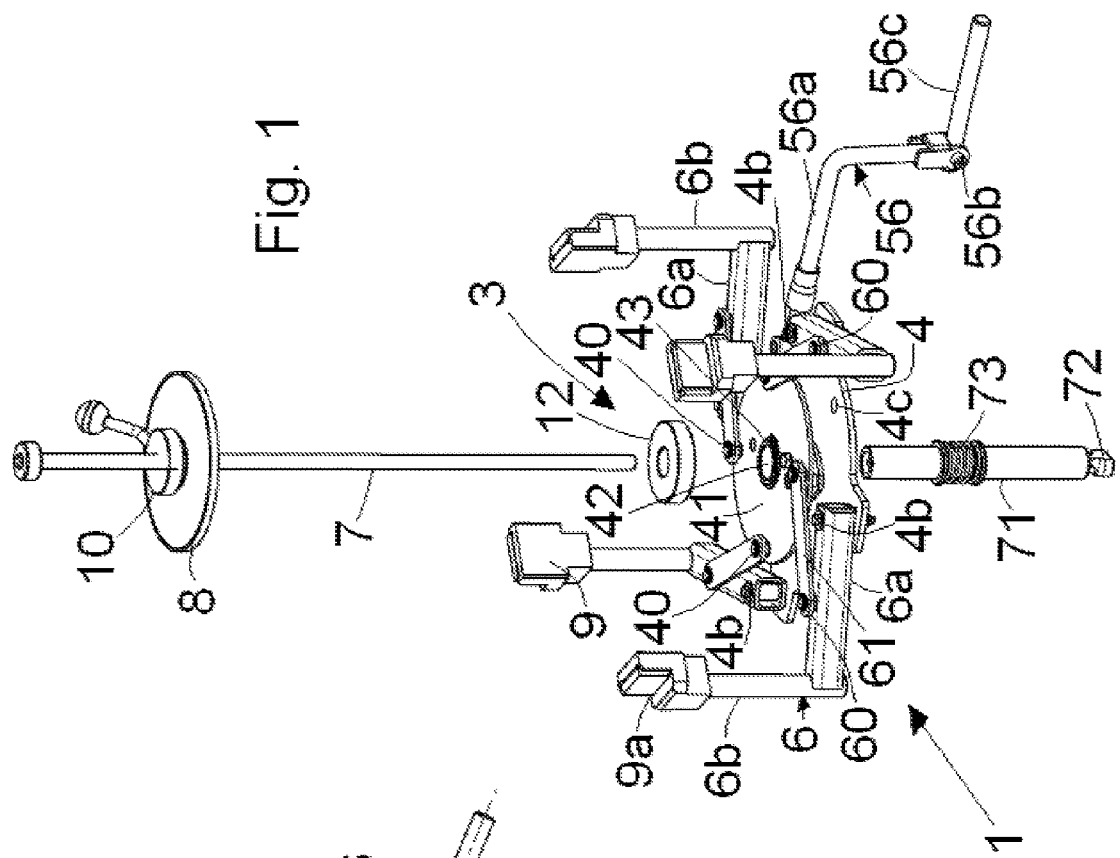
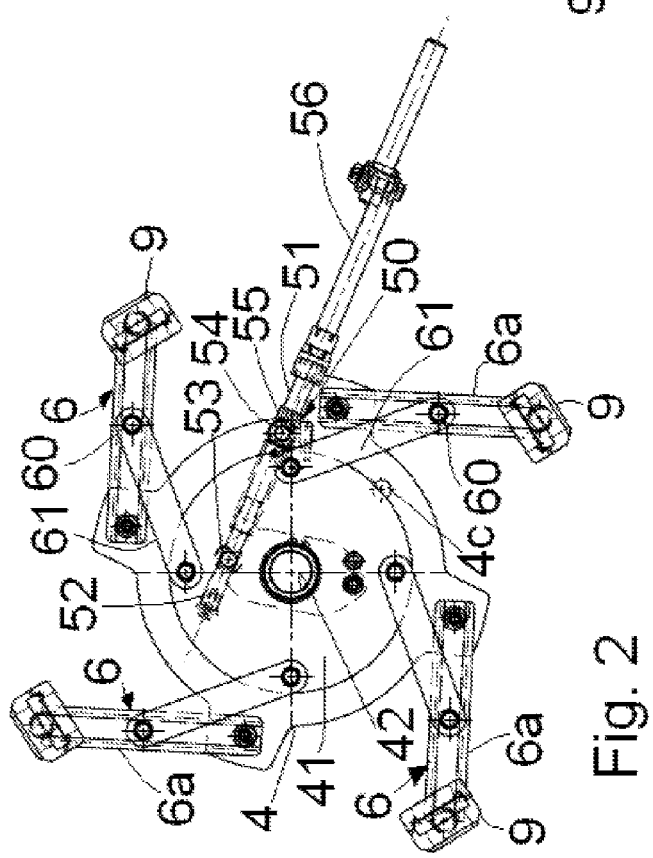

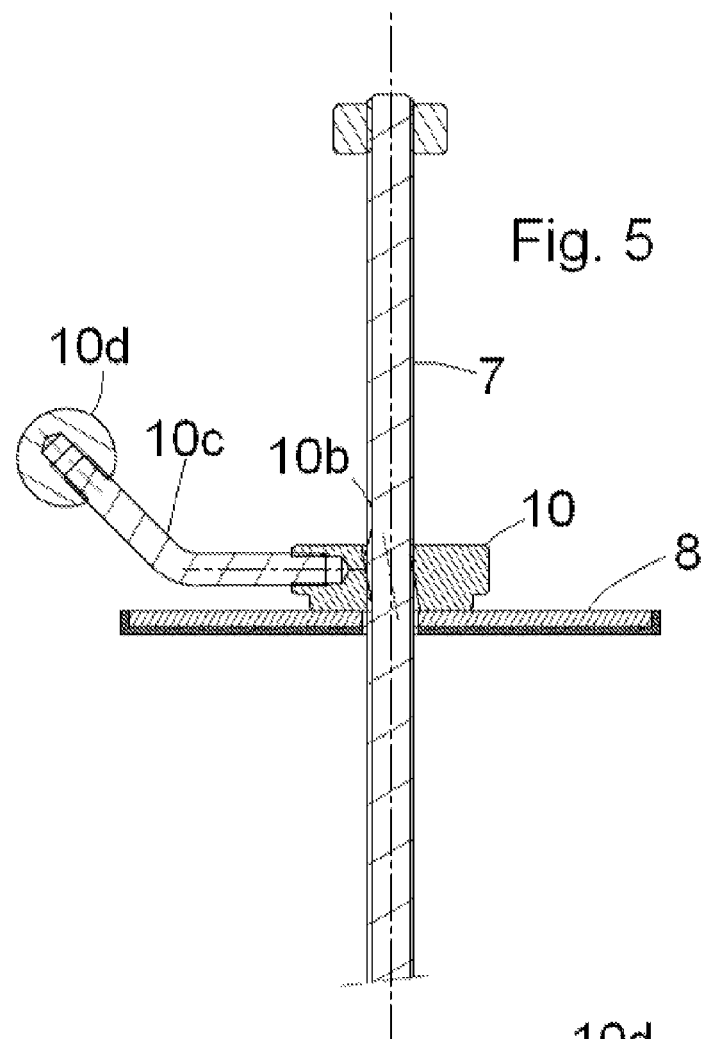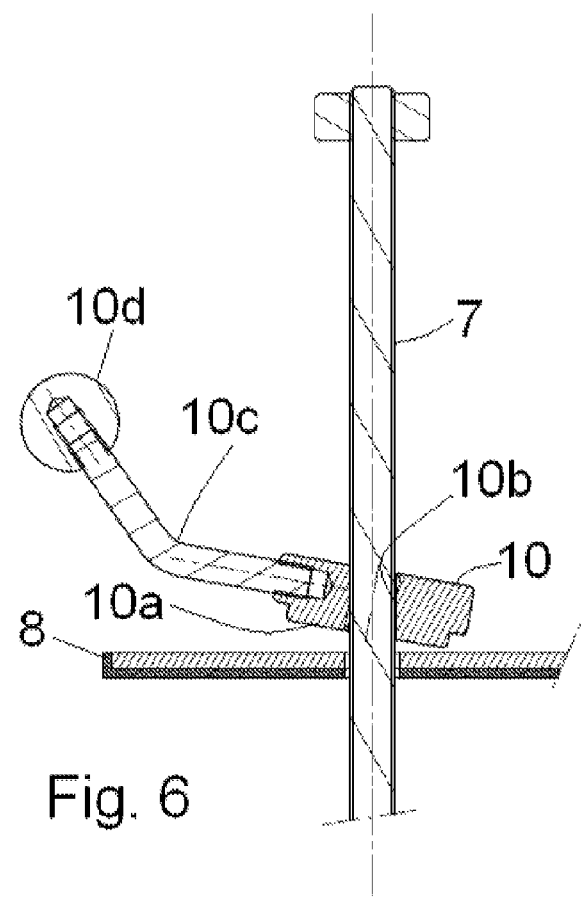

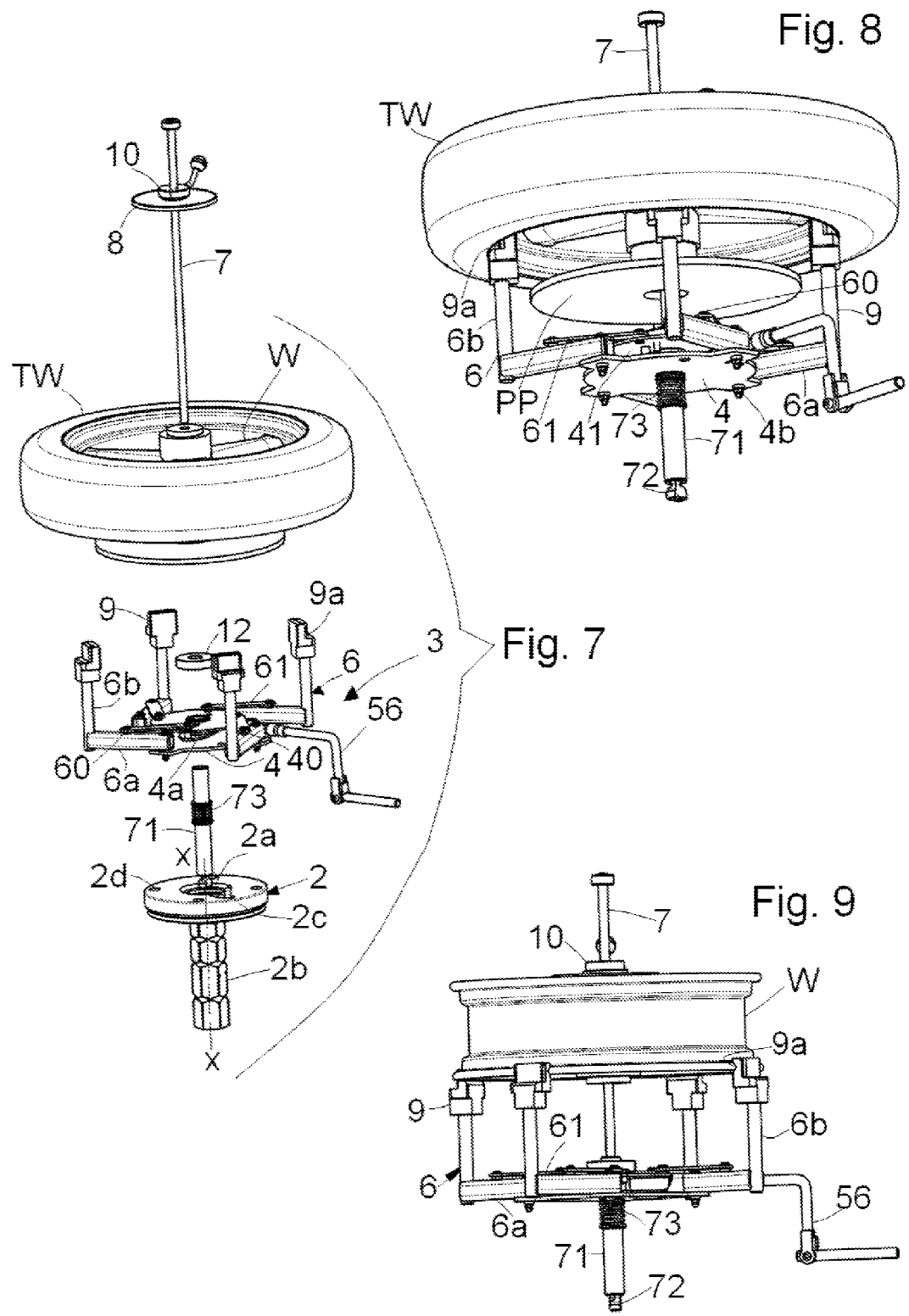

TOOL FOR SUPPORTING AND LOCKING A RIM OR TIRED WHEEL FOR MOTORCYCLES

FIELD OF INVENTION

The present invention regards a tool for supporting and locking a tired wheel or rim for a motorcycle on a tire mounting-demounting machine for automobile wheels, as well as a method of adapting a tire mounting-demounting machine for automobile wheels for the maintenance of motorcycle wheels and a method of handling a motorcycle wheel by means of a tire mounting-demounting machine for automobile wheels.

BACKGROUND OF INVENTION

In the present description and in the claims, with the expression "rim or tired wheel of or for motorcycles" it is intended a rim or a tired wheel having a central through hole of smaller diameter than the central through hole of a rim or tired wheel for automobiles, even if this is a rim or tired wheel that is not for motorcycles.

As is known, tire mounting-demounting machines for mounting-demounting tires on-from rims for automobiles are equipped with a support table that can be fixed or drivable in rotation; in such case, it also drives in rotation a rim or tired wheel loaded thereon. The wheel-carrier rotatable table usually has a threaded central hole of standard 40 mm diameter and is equipped with jaws for engaging and locking a rim (bare or tired) arranged thereon. Once the jaws are tightened against the rim, a threaded pin or bar is inserted in a loose manner; after having crossed through the central hole of the rim, such pin/bar is screwed into the threaded hole of the wheel-carrier table. The threaded pin or bar has a length much greater than the thickness or width than the rim, so that the threaded pin or bar projects from the rim even after its screwing in the wheel-carrier table. A cone is screwed on the projecting part of the threaded pin or bar, until such cone is brought into forced abutment against rim; the rim will thus be tightened between the wheel-carrier table and the cone, so that it is made integral in rotation with the wheel-carrier table.

Motorcycle wheels have their rim provided with central through hole having a standard diameter of about 18 mm, such that a normal tire mounting-demounting machine for automobile wheels is not adapted to be used for motorcycle wheels.

It would be desirable to be able to arrange a tire mounting-demounting machine with universal use, i. e. usable for handling rims and tired wheels of automobiles as well as motorcycles.

Tire mounting-demounting machines have also been proposed lacking wheel-carrier rotatable table and equipped with multiple expansion arms for the engagement of the rim, angularly mounted spaced around a rotatable shaft, as taught by the patent application EP-0 499 825 (for example). Each expansion arm bears at its head a respective pad for engaging against an edge of a rim, usually the internal edge.

As will be understood, with the expansion arms during the locking-releasing operations, there is the risk of impacting or in any case interfering with projecting portions of a motorcycle wheel, whose rim is integral or which is in any case made integral with a brake disc (front wheel of the motorcycle) or a chain sprocket (rear wheel). In addition, as specified above with regard to the size of the threaded pin or bar, one would in any case not be able to lock a motorcycle wheel against the expansion arms.

EP-0 001 855, DE-16 80 348, WO-2009/015920, US-2005/199349, and FR-1 567 801 disclose respectively prior art tools for supporting and locking a rim or tired wheel in position on a tire mounting-demounting machine.

SUMMARY OF THE INVENTION

The main object of the present invention is to provide a tool for supporting and locking tired motorcycle wheels or rims, capable of making a tire mounting-demounting machine per automobiles that can also be used for the maintenance of motorcycle wheels.

Another object of the present invention is that said support and lock tool is simple to apply and relatively inexpensive to produce.

Another object of the present invention is to provide a tool for supporting and locking rims or tired wheels equipped with bulky parts, such as a brake disc or a chain sprocket.

Another object of the present invention is to provide a method for converting a tire mounting-demounting machine for automobile wheels such that it can also handle motorcycle wheels.

According to a first aspect of the present invention, a tool is provided for supporting and locking a rim or tired wheel in position on a tire mounting-demounting machine for automobile wheels equipped with support table with an axial hole or opening, the tool comprising:

a grip-release device for a tired wheel or a rim to be handled, the grip-release device having a base plate formed with an axial hole and removably arrangeable on the support table, whereby it cannot rotate with respect thereto, and a plurality of angled or elbow-shaped arms, each bearing at one end thereof a jaw or pad member designed to engage the edge of a rim to be handled, such angled or elbow-shaped arms being angularly supported by the base plate at a predetermined distance from one another, thereby being suitable for adjustably moving their jaw or pad members between a mutual maximum and minimum approach-moved apart position, and locking means for locking the grip-release device to the support table and/or for locking the rim or tired wheel against the jaw or pad members, the locking means comprising a diameter adapter member removably connectable, on the one side to the axial hole or opening of the support table whereby it cannot rotate with respect thereto, and comprising a bar member removably connectable, to the other side of the diameter adapter member through the central hole of the rim or tired wheel supported by the jaw or pad members.

Advantageously, the diameter adapter member comprises a diameter reducer member.

According to another aspect of the present invention, a tire mounting-demounting machine is provided that is equipped with a tool as stated above according to the present invention.

According to another aspect of the present invention, a method is provided for converting or adapting a support table with a central hole or opening of a machine for handling tired automobile wheels for the support of motorcycle wheels, the method comprising the following steps, not necessarily in sequence:

assembling at least one grip-release device for a tired wheel or a wheel rim, which comprises:

a base plate with an axial hole, removably arrangeable on the support table, whereby it cannot rotate with respect thereto, a plurality of angled or elbow-shaped arms, each bearing at one end thereof a jaw or pad member designed to engage the edge of a rim to be handled, such arms being mutually angularly supported at a distance from the base plate, whereby they can adjustably move their jaw or pad members between mutual maximum and minimum approach-moved part positions, locking means for locking the grip-release device to the support table and/or for locking the rim or tired wheel against the jaw or pad members, comprising a diameter adapter member removably connectable, at the one end, to the axial hole or opening of the support table whereby it cannot rotate with respect thereto, a bar removably connectable to the other end of the diameter adapter member, in use, through the central hole of a rim or tired wheel supported by the jaw or pad members.

BRIEF DESCRIPTION OF THE DRAWINGS

Further aspects and advantages of the present invention will be clearer from the following detailed description of its specific embodiments of a support and lock tool, such description made with reference to the enclosed drawings, in which:

FIG. 1 is a slightly top, partially-exploded perspective view of a tool according to the present invention;

FIG. 2 is a top view with transparent parts of some components of the tool of FIG. 1;

FIGS. 5 and 6 are side views with parts in section which illustrate means for locking a tool according to the present invention;

FIGS. 7 and 8 are respectively slightly top and bottom perspective views which illustrate respective steps for supporting and locking a tired motorcycle wheel employing the tool of FIG. 1;

FIG. 9 illustrates another tool according to the present invention which supports and locks the small external edge of a motorcycle rim;

In the drawing set, equivalent or similar parts or components were marked with the same reference numbers.

DETAILED DESCRIPTION OF THE PREFERRED EMBODIMENTS

Figure 3:
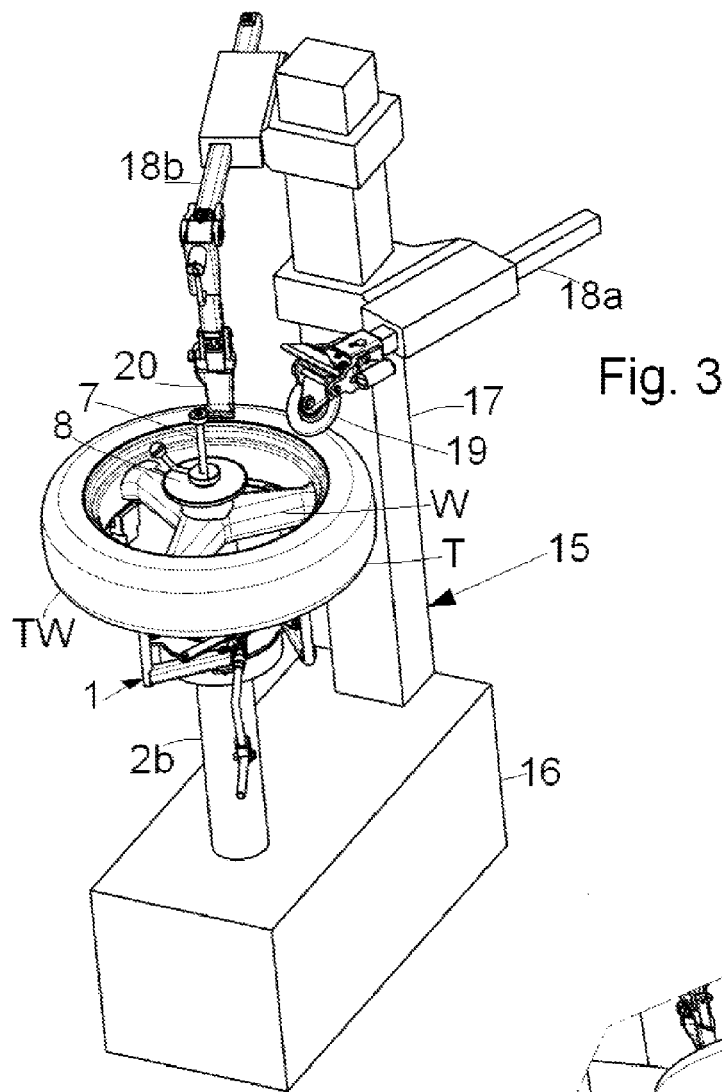
FIGS. 3 and 4 are respectively slightly top and bottom perspective views of a tire mounting and demounting machine for automobile wheels equipped with the tool of FIG. 1 and with a tired wheel of a motorcycle applied thereon.
Figure 4:
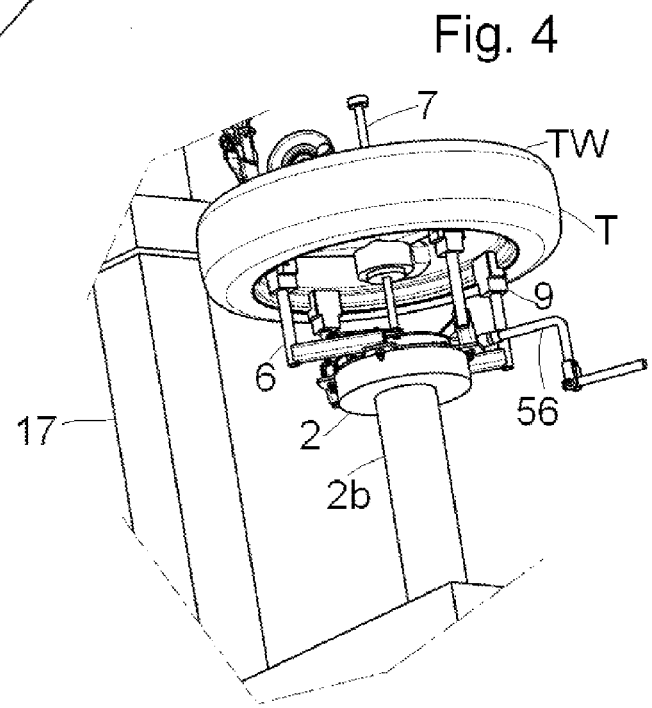

First, with reference to FIGS. 1 to 8, an embodiment is illustrated of a tool or device 1 for supporting and locking a tired motorcycle wheel TW or a motorcycle rim W to be subjected to maintenance (typically for operations of mounting a tire T on a rim W and the demounting thereof) in position on a tire mounting-demounting machine 15 of any suitable type for automobile wheels. The tire mounting-demounting machine 15 is equipped with support table 2, preferably rotatable around a substantially vertical axis x-x. The support table 2 is formed with an axial through hole or opening 2a with diameter equal to or greater than 40 mm (for example), a drive pin 2c which extends in the direction of the axis x-x, but is offset with respect thereto, and two or more (four in the present embodiment) notches or holes 2d angularly spaced at the peripheral zone of the support table 2. The latter is preferably supported integral in rotation at the top of a hollow shaft 2b, internally threaded and coaxial with the hole 2a and with internal diameter of 40 mm, as is normal at the state of the art. The shaft 2b, better seen in FIGS. 3 and 4, is projected upward from the base of the tire mounting-demounting machine 15 and is drivable in rotation on command, by actuation means such as an electric motor or a pneumatic motor.

The support and lock tool 1 is formed by a device 3 for gripping-releasing a wheel TW or rim W to be handled. The grip-release device 3 comprises a base plate 4, in which the following are obtained: a central through hole or opening 4a, three or more (four in the Figures) peripheral, angularly-spaced through holes (not visible in the drawings) for receiving the same number of articulation pins 4b, as well as a through hole 4c offset with respect to the axis of the hole 4a and designed or intended to receive, in use, the pin 2c projected upward from the support table 2. Preferably, the articulation pins 4b are uniformly, angularly spaced around the central hole 4a and at a uniform distance therefrom that is greater than the diameter of the support table 2.

At each articulation pin 4b, preferably constituted by a bolt, the base plate 4 is set to support the same number of means for engaging a rim W or tired wheel TW. More particularly, the engagement means are constituted by two or more elbow-shaped arms, preferably four elbow-shaped arms 6 adjustable in work position and each having one end thereof articulated to the base plate 4 at a respective pin 4b; the other end of each arm 6 is upright with respect to the base plate 4 and bears at the top a respective jaw or pad abutment member 9 designed to engage the edge of a rim W to be handled. With one such structure, the arms 6 can adjustably move their own jaw or pad member 9 between a mutual maximum and minimum approach-moved apart position.

The arms 6 are preferably angled or configured as an elbow or L-shaped and comprise a first section 6a constrained to the base plate 4 and extended substantially horizontally in use, and a second section 6b extended substantially perpendicular to the first section, in use parallel to the rotation axis x-x and equipped at its head with a respective pad 9. Each pad 9 is preferably rotatably mounted around a longitudinal axis of the respective section 6b. In the embodiment illustrated in FIGS. from 1 to 8, the pads 9 have a work surface 9a or surface of abutment against the internal edge of a wheel TW or rim W, at which a preferably L-configured seat is delimited or a V-configured or tilted-plane notch is delimited.

At an intermediate position of each first section 6a of the arms 6, an articulation pin 60 is provided for, at which one end of a respective spring shackle 61 is articulated; the other end of the spring shackle 61 is pivoted to a respective pin 40 articulated to an oscillatable plate 41 substantially coplanar with the base plate 4, but maintained spaced therefrom and supported by the plurality of spring shackles 61. The oscillatable plate 41 has a central through hole 42 coaxial with and having for example the same or slightly larger diameter than the coaxial hole of the support plate 4. Preferably, the oscillatable plate 41 has smaller size than that of the support plate 4; around the hole 42, the oscillatable plate 41 is equipped with a small conical collar 43, at the surface thereof opposite that facing the support plate 4, for engaging an annular spacer 12.

Between the base plate 4 and the oscillatable plate 41, an actuator device 50 is provided, which can be of manual or automatic functioning type. In the illustrated embodiment it is manually functioning; for example, it is constituted by a control arm 51 and by a controlled arm 52, operatively connected in a manner such that in use they can mutually approach-move apart from each other on command (e. g. manual). Typically, the controlled arm 52 is pivoted at 53 to the oscillatable plate 41 at the face of the latter turned towards the base plate 4 and has one end thereof externally threaded or one hollow end internally threaded. The base plate 4 bears, at its face turned towards the oscillatable plate 41, a pin 54 at which a support bush 55 is articulated. The control arm 51 at an intermediate section thereof is mounted for rotation, but not longitudinally movable, in the support bush 55, so as to have one end thereof engaged for screwing with the threaded end of the controlled arm 52 and the other end thereof equipped with constraining means for driving in rotation, e.g. a hexagonal head or the like, for the preferably removable engagement with actuator means, such as a crank 56. The crank 56 is preferably constituted by an elbow-shaped arm 56*a* having one end thereof engageable with the hexagonal head of the controlled arm 52 and the other end thereof pivoted at 56*b* to the head of a control handle or grip 56*c*.

In use, the control 51 and controlled 52 arms are aligned along a non-diametrical axis with respect to the concentric base 4 and oscillatable 41 plates, such that, for example, by actuating the crank 56 in the mutual approaching direction of the control and controlled arms 51 and 52, the mutual expansion or moving apart of the pads 9 is caused due to the consequent relative angular movement of the oscillatable plate 41 with respect to the base plate 4*a*, such angular movement being transmitted to the arms 6 by the spring shackles 61. By actuating in the opposite direction, the mutual contraction or approaching of the pads is caused.

Once the desired expansion or contraction of the pads 9 is commanded, the crank 56 can be removed and moved away from the work zone.

The support and locking device 1 also comprises locking means. These comprise a threaded bar or bar member 7, on which a plate or disc 8 is screwable which in use is intended to be abutted and tightened against the hub of a wheel or rim to be locked in position (FIG. 3); the device 1 also comprises a diameter adapter member, e. a diameter reducer member, such as a reducer shaft 71, removably connectable both with the hole 2*a* of the support table 2, so as to be integral in rotation therewith, and with the threaded bar 7, the threaded bar 7 being designed to be inserted in the central hole of a rim W or tired wheel TW. For such purpose, one end of the reducer shaft 71 is insertable in the axial through hole 2*a* of the support table 2 and is removably constrainable thereto, e.g. by means of bayonet coupling 72 or the like, whereas the other end thereof is hollow, internally threaded and intended to receive and be engaged for screwing with the threaded bar 7.

Advantageously, an elastic means is inserted on the reducer shaft 71, such as a helical spring 73, intended to act as a damping component between the support table 2 and the base plate 4.

The reducer shaft 71 is therefore intended to rotate coaxially with the support table 2 and against the spring 73 mounted thereon, and the plate 8 tightens the rotatable equipment formed by the grip and release device 3 with a rim W or tired wheel TW mounted thereon.

In order to maintain the plate 8 locked in tightened work position, a collar block 10 is provided on the bar 7, as is normal at the state of the art. Such block 10 has a substantially flat surface 10*a* of abutment against the plate 8 and a tilted through hole 10*b*, i.e. not perpendicularly extended with respect to the abutment surface 10*a*, and having an opening such to be able to slide with a small clearance on the bar 7 when oriented parallel to the bar itself. With one such structure, when the collar block 10 is maintained with abutment surface 10*a* at about 90° with respect to the bar 7, it is locked in position, whereas when it is placed with its hole 10*b* substantially aligned with the bar 7, it is possible to make the block 10 slide along the bar 7.

Preferably, a handle 10*c* is provided for, which projectingly extends from the block 10 and is preferably equipped with knob 10*d*, intended to control the tilt of the block 10 with respect to the bar 7 and hence the locking-unlocking of the block 10 on the bar 7.

In order to adapt a tire mounting-demounting machine for automobiles to handle motorcycle wheels, making use of an above-described support and lock tool 1, the diameter adapter member, e.g. reducer shaft 71 is inserted in the axial hole 2*a* of the support table 2 and it is locked in position, then the grip and release device 3 is mounted, by making the pin 2*c* of the table 2 engage in the hole 4*c* of the base plate 4. By operating the crank 56, the pads 9 are brought into a position roughly capable of receiving the wheel rim W of the wheel that one wishes to handle; the rim or wheel is then set on the pads 9. The crank 56 is operated in order to adequately tighten the arms 6 and then the pads 8 against the rim, and then the threaded bar 7 is inserted into the central hole of the rim in order to pass it through the oscillatable 41 and base 4 plates and to screw it into the shaft 71. The plate 8 is screwed until it is tightened against the rim, preferably with the interposition of a plastic material washer 7*a* for the protection of the rim, and the collar block 10 is brought against the plate 8 and locked in position.

The pads 9 are preferably abutted against a respective portion of the internal edge of the rim W (see FIG. 8 in particular).

A motorcycle wheel TW often has a brake disc PP or a chain sprocket incorporated therein. In such case, providing the sections 6*b* with adequate length allows housing the disc PP in the free space between the level of the oscillatable plate 41 and that of the pads 9.

In FIGS. 3 and 4, a tire mounting-demounting machine 15 is illustrated for automobile wheels of any suitable type; on such machine, a tool according to the present invention has been installed. The tire mounting-demounting machine 15 generally comprises a base 16, from which both the hollow shaft 2*b* and a column 17 are upwardly projected. From such column 17, one or more support arms 18*a*, 18*b* for respective work tools are projectingly extended; such tools can include a bead breaking tool 19 or a tire mounting-demounting tool 20.

In FIG. 9, a tool according to the present invention is illustrated that is similar to that described above, but equipped with pads 9 intended to be engaged with respective external portions of the edge of a rim. Preferably, according to this embodiment, the pads are equipped with work or engagement surface 9*a* configured as a notch or a V-shaped groove with inwardly-decreasing section.

Figure 10:
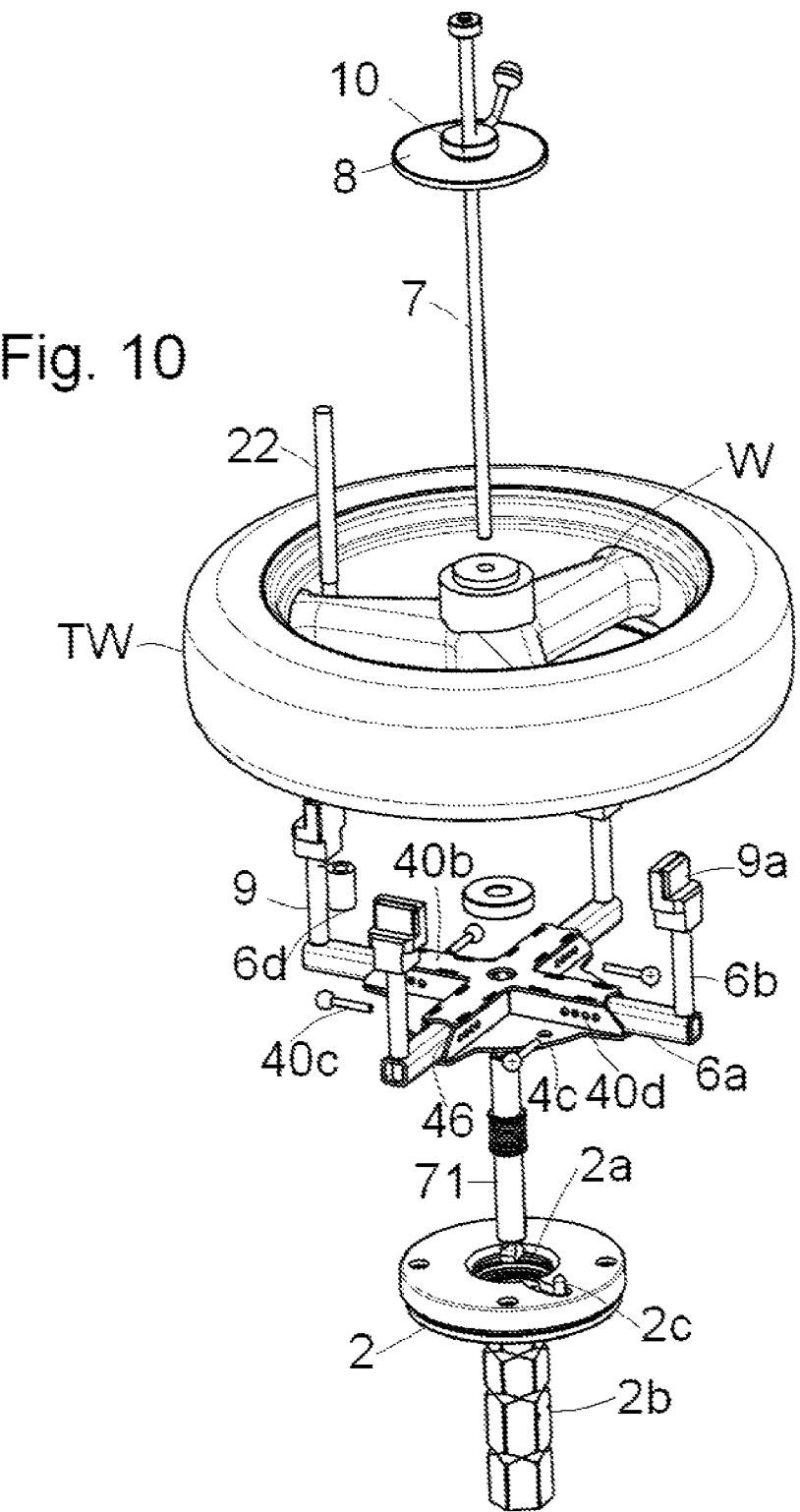
FIG. 10 is a slightly top view which illustrates another tool embodiment according to the present invention.

In FIG. 10, a tool embodiment according to the present invention is illustrated that is similar to that of the embodiment described above with reference to FIGS. 1-9, but in which the engagement means comprise telescopic arms 6. The base plate 4 bears three or more (four in the Figure) sleeves 40*b* arranged angularly spaced (intersected at right angles in the Figure), each delimiting a slide-receiving seat 46 in which a respective section 6*a* of an elbow-shaped arm 6 is slidably mounted.

The exit/insertion of the sections 6*a* with respect to the respective sleeves 40*b* can be manually controlled, or controlled by means of the use of an actuator of any suitable type.

If the exit/insertion of the arms 6 is manually controlled, as illustrated in FIG. 10, the fixing in work position of each arm can be carried out by means of a respective pin or screw 40c insertable in one of a plurality of holes 40d made in each sleeve 40b and possibly in the respective section 6a of the arm insertable therein. Since, in this case, the tightening between the pads 9 and the edge of the rim might not be sufficiently tight so as to ensure the transmission of the rotation motion from the arms 6 to the rim W, it is advantageous to provide (for example) a bush 6d fixed on a section 6b of an arm 6, in which it is possible to insert a rod or a bar 22, which by being engaged in the spokes of the rim W ensures a secure driving in rotation. In the base plate 4, a hole 4c is provided, as already specified, which is intended to receive the pin 2c that projects upward from the rotatable support table 2.

Figure 11:
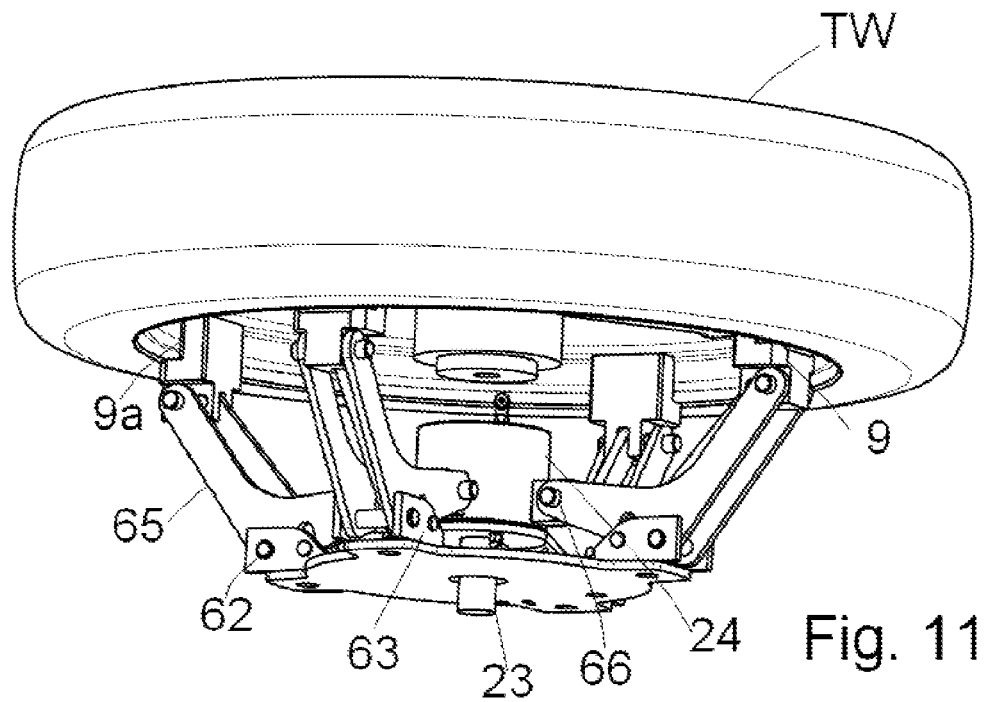
FIGS. 11 and 12 are respectively a bottom perspective view with tired wheel and a slightly top perspective view without tired wheel, which illustrates angled elbow-shaped arms in accordance with another tool embodiment according to the present invention.
Figure 12:
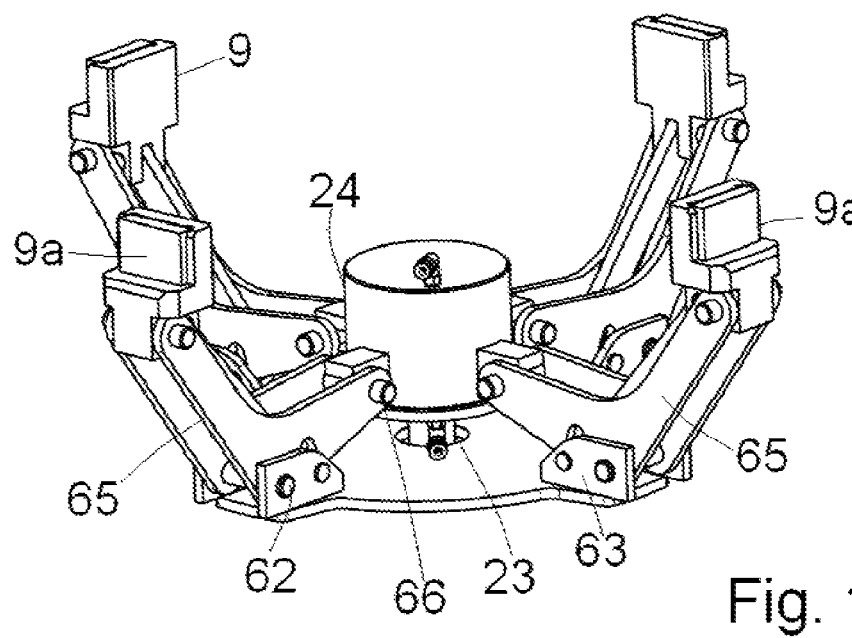

FIGS. 11 and 12 illustrate a variant of the engagement means for a tool according to the present invention, comprising a plurality (four in the embodiments) of arms or elbow-shaped levers 65. In such case, the base plate 4 delimits a central hole in which a hub 23 extends that supports an actuator ring 24, e. g. actuated by a pneumatic linear actuator (not shown). The base plate 4 supports the (four) arms or elbow-shaped levers 65 that are circumferentially angularly spaced from each other, each having one end thereof articulated in 66 to the ring 24 and the elbow thereof articulated in 62 to a pair of brackets 63 fixed or integral with the base plate 4. The free end of each arm 65 bears a respective pad 9. By controlling the movement of the actuator ring 24, the angular movement of each arm 65 around the articulation pin 62 thereof is determined, and hence the movement of the respective pads 9 is also determined.

As can be understood, a tool according to the present invention allows adapting a support table 2 for an automobile wheel that has a through hole of about 40 mm to the support for a wheel with different dimensions, typically a motorcycle wheel, which has a much smaller axial through hole, usually about 18 mm.

The tool according to the present invention is therefore simple and practical to apply to and demount from a tire mounting-demounting machine for automobile wheels. It also results extremely versatile since it can be applied to wheels having very different sizes and characteristics with respect to each other.

The above-described tool and the method are susceptible to numerous modifications and variants within the protective scope defined by the following claims.

What is claimed is:

1. A tool for supporting and locking a rim or tired wheel in position on a tire mounting-demounting machine for automobile wheels equipped with support table with an axial hole or opening, comprising:
   a grip-release device for a tired wheel or a rim to be handled, the grip-release device having a base plate formed with an axial hole and removably arrangeable on said support table, whereby it cannot rotate with respect thereto, and a plurality of angled or elbow-shaped arms, each bearing at one end thereof a jaw or pad member designed to engage the edge of a rim to be handled, such angled or elbow-shaped arms being angularly supported by said base plate at a predetermined distance from one another, thereby being suitable for adjustably moving their jaw or pad members between a mutual maximum and minimum approach-moved apart position, and
   locking means for locking said grip-release device to said support table and/or for locking said rim or tired wheel against said jaw or pad members, said locking means comprising a diameter adapter member removably connectable, on the one side to said axial hole or opening of said support table whereby it cannot rotate with respect thereto, and comprising a bar member removably connectable, to the other side of said diameter adapter member through the central hole of the rim or tired wheel supported by said jaw or pad members, wherein one end of the diameter adapter member is insertable in the axial through hole of said support table and is removably constrainable thereto.

2. A tool according to claim 1, wherein said diameter adapter member comprises a diameter reducer member.

3. A tool according to claim 1, wherein said locking means comprises a locking collar element insertable on said bar member in order to removably lock a rim or tired wheel thus supported against said jaw or pad members.

4. A tool according to claim 3, wherein said locking collar element has a substantially flat abutment surface and a tilted through hole, i.e. not extended perpendicular to said abutment surface, and having an opening suitable for sliding on said bar when oriented parallel thereto.

5. A tool according to claim 1, wherein said base plate of said grip-release device supports at least three sleeve elements arranged angularly spaced and each delimiting a slide-receiving seat for a respective end of an elbow-shaped arm.

6. A tool according to claim 5, wherein each elbow-shaped arm is fixable in position within a respective slide-receiving seat by means of a pin or screw insertable in a plurality of holes provided in each sleeve element.

7. A tool according to claim 5, comprising a bush element fixed to one arm, and a rod or bar insertable in said bush element and engageable in a spoke of the rim in order to make it integral in rotation with said grip-release device.

8. A tool according to claim 1, wherein each elbow-shaped arm comprises a first section and a second section angled with respect to the first section and bearing a respective jaw or pad member, wherein said grip-release device comprises:
   an oscillatable plate which is substantially coplanar, in use, with said base plate and has a central through hole that is coaxial with the hole of the base plate and has the same or slightly larger diameter than said coaxial hole in the base plate,
   a plurality of spring shackle elements, each having one end thereof articulated to an articulation pin at an intermediate position of a respective first section of an arm and the other end thereof pivoted to a respective pin articulated to said oscillatable plate, and
   an actuator device designed to operate between said base plate and said oscillatable plate whereby controlling angular movements of the same in opposite direction, such angular movements by means of said spring shackle elements resulting in corresponding mutual approaching-moving apart movements between said jaw or pad members.

9. A tool according to claim 8, wherein said actuator device comprises a control arm and a controlled arm operatively connected to each other whereby, in use, they can mutually approach-move apart from each other on command.

10. A tool according to claim 9, wherein said controlled arm is pivoted to said oscillatable plate and has one end thereof threaded, whereas said control shaft at an intermediate section thereof is mounted for rotation, but not longitudinally movable, in a support bush articulated to said base plate and has one end thereof in screwing engagement with said threaded end of said controlled arm and its other end equipped with constraining means for engaging an actuator means.

11. A tool according to claim 9, wherein said controlled arm is pivoted to said oscillatable plate and has one end thereof threaded, whereas said control shaft at an intermediate section thereof is mounted for rotation, but not longitudinally movable, in a support bush articulated to said base plate and has one end thereof in screwing engagement with said threaded end of said controlled arm and its other end equipped with constraining means for engaging an actuator means, and
    wherein said actuator means comprises a crank including an elbow-shaped arm having one end thereof engageable with said means for constraining the controlled arm and its other end pivoted at the head of a control handle or grip.

12. A tool according to claim 1, wherein said base plate delimits a central hole, in which a hub extends which supports an actuator ring, and supports a plurality of elbow-shaped arms or levers circumferentially angularly spaced from each other and each having one end thereof articulated to the actuator ring and the elbow thereof articulated at an articulation pin to a pair of brackets fixed to or integral with the base plate, the free end of each elbow-shaped arm bearing a respective jaw or pad member, whereby upon controlling the movement of the actuator ring angular movement of the elbow-shaped arms around their articulation pin is caused, and thus the respective jaw or pad members are moved.

13. A tool according to claim 1, wherein said adapter member comprises a reducer shaft removably connectable at one end thereof to said support table and to said threaded bar at the other end thereof.

14. A tool according to claim 13, wherein said reducer shaft is integral in rotation with said support table and is engageable via screwing with said threaded bar.

15. A tool according to claim 13, wherein on said reducer shaft an elastic means is provided designed to act as a damping component between the support table and the base plate.

16. A tool according to claim 1, comprising a plate or disc designed, in use, to be abutted and tightened against the hub of a rim or tired wheel to be locked in position.

17. A tire mounting-demounting machine when equipped with a tool according to claim 1.

18. A method of converting or adapting a support table with a central hole or opening of a machine for handling tired automobile wheels for the support of motorcycle wheels, said method comprising the following steps, not necessarily in sequence:
    assembling at least one grip-release device for a tired wheel or a wheel rim, which comprises:
        a base plate with an axial hole, removably arrangeable on said support table,
        whereby it cannot rotate with respect thereto,
        a plurality of angled or elbow-shaped arms, each bearing at one end thereof a jaw or pad member designed to engage the edge of a rim to be handled, such arms being mutually angularly supported at a distance from said base plate, whereby they can adjustably move their jaw or pad members between mutual maximum and minimum approach-moved part positions,
    locking means for locking the grip-release device to said support table and/or for locking the rim or tired wheel against the jaw or pad members, comprising a diameter adapter member removably connectable, at the one end, to the axial hole or opening of the support table whereby it cannot rotate with respect thereto, a bar removably connectable to the other end of said diameter adapter member, in use, through the central hole of a rim or tired wheel supported by said jaw or pad members, wherein one end of the diameter adapter member is insertable in the axial through hole of said support table and is removably constrainable thereto.

19. A method according to claim 18, wherein said assembling step comprises the assembly of a tool for supporting and locking a rim or tired wheel in position on a tire mounting-demounting machine for automobile wheels equipped with support table with an axial hole or opening, comprising:
    a grip-release device for a tired wheel or a rim to be handled, the grip-release device having a base plate formed with an axial hole and removably arrangeable on said support table, whereby it cannot rotate with respect thereto, and a plurality of angled or elbow-shaped arms, each bearing at one end thereof a jaw or pad member designed to engage the edge of a rim to be handled, such angled or elbow-shaped arms being angularly supported by said base plate at a predetermined distance from one another, thereby being suitable for adjustably moving their jaw or pad members between a mutual maximum and minimum approach-moved apart position, and
    locking means for locking said grip-release device to said support table and/or for locking said rim or tired wheel against said jaw or pad members, said locking means comprising a diameter adapter member removably connectable, on the one side to said axial hole or opening of said support table whereby it cannot rotate with respect thereto, and comprising a bar member removably connectable, to the other side of said diameter adapter member through the central hole of the rim or tired wheel supported by said jaw or pad members.

* * * * *